(12) United States Patent
Tippetts

(10) Patent No.: US 11,481,168 B2
(45) Date of Patent: *Oct. 25, 2022

(54) DATA STREAMS OF PRODUCTION INTENTS

(71) Applicant: HEWLETT-PACKARD DEVELOPMENT COMPANY, L.P., Spring, TX (US)

(72) Inventor: Ronald Tippetts, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/467,903

(22) Filed: Sep. 7, 2021

(65) Prior Publication Data

US 2021/0397393 A1 Dec. 23, 2021

Related U.S. Application Data

(63) Continuation of application No. 16/975,500, filed as application No. PCT/US2018/027871 on Apr. 17, 2018, now Pat. No. 11,210,042.

(51) Int. Cl.
*G06F 3/12* (2006.01)

(52) U.S. Cl.
CPC .......... *G06F 3/1241* (2013.01); *G06F 3/1211* (2013.01); *G06F 3/1234* (2013.01); *G06F 3/1261* (2013.01); *G06F 3/1285* (2013.01)

(58) Field of Classification Search
CPC .... G06F 3/1241; G06F 3/1211; G06F 3/1234; G06F 3/1261; G06F 3/1285; G06F 3/121; G06F 3/1215

See application file for complete search history.

(56) References Cited

U.S. PATENT DOCUMENTS

| | | | |
|---|---|---|---|
| 5,517,316 A | 5/1996 | Hube | |
| 6,724,494 B1 | 4/2004 | Danknick | |
| 6,970,261 B1 | 11/2005 | Robles | |
| 7,061,636 B2 | 6/2006 | Ryan | |
| 7,884,962 B2 | 2/2011 | Motamed et al. | |
| 7,936,469 B2 | 5/2011 | Gregory | |
| 7,940,408 B2 | 5/2011 | Kitada | |
| 8,064,084 B2 | 11/2011 | Khain | |
| 8,468,244 B2 | 6/2013 | Redlich | |
| 9,036,200 B2 | 5/2015 | Kamath | |
| 9,069,799 B2 | 6/2015 | Vijayan | |

(Continued)

FOREIGN PATENT DOCUMENTS

| | | |
|---|---|---|
| JP | 2004192507 A | 7/2004 |
| JP | 2005025562 A | 1/2005 |

*Primary Examiner* — Juan M Guillermety
(74) *Attorney, Agent, or Firm* — Fabian VanCott

(57) ABSTRACT

A data state manager may include a production intent module to define a production intent, a capability module to identify a number of capabilities of a plurality of media printing devices to which the data state manager is coupled, and a data stream module to, through a plurality of communication links to the media printing devices, stream a plurality of data streams to the plurality of media printing devices in a synchronized manner based on a number of characteristics of the streamed data and the identified capabilities of the media printing devices, with the data streams defining the production intent.

20 Claims, 6 Drawing Sheets

(56) References Cited

U.S. PATENT DOCUMENTS

| | | |
|---|---|---|
| 9,202,150 B2 | 12/2015 | Miyahara |
| 11,210,042 B2 * | 12/2021 | Tippetts ................ G06F 3/1285 |
| 2004/0190042 A1 * | 9/2004 | Ferlitsch ............... G06F 3/1205 |
| | | 710/16 |
| 2008/0145125 A1 | 6/2008 | Mestha et al. |
| 2008/0174802 A1 | 7/2008 | Sampath |
| 2009/0025002 A1 | 1/2009 | Rai |
| 2009/0033979 A1 | 2/2009 | Morales |
| 2012/0288298 A1 * | 11/2012 | Toriyabe ............ G03G 15/6538 |
| | | 399/82 |
| 2016/0274842 A1 | 9/2016 | Kuroyanagi |

* cited by examiner

DATA STREAMS OF PRODUCTION INTENTS

BACKGROUND

A print service provider (PSP) may use digital presses to print a variety of products. The digital presses used to produce the printed products may be loaded with a variety of substrates on which text and images are printed. Digital front ends (DFEs) may be used to convert customer print jobs to the submission format of the digital presses and queue the jobs to the digital presses.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
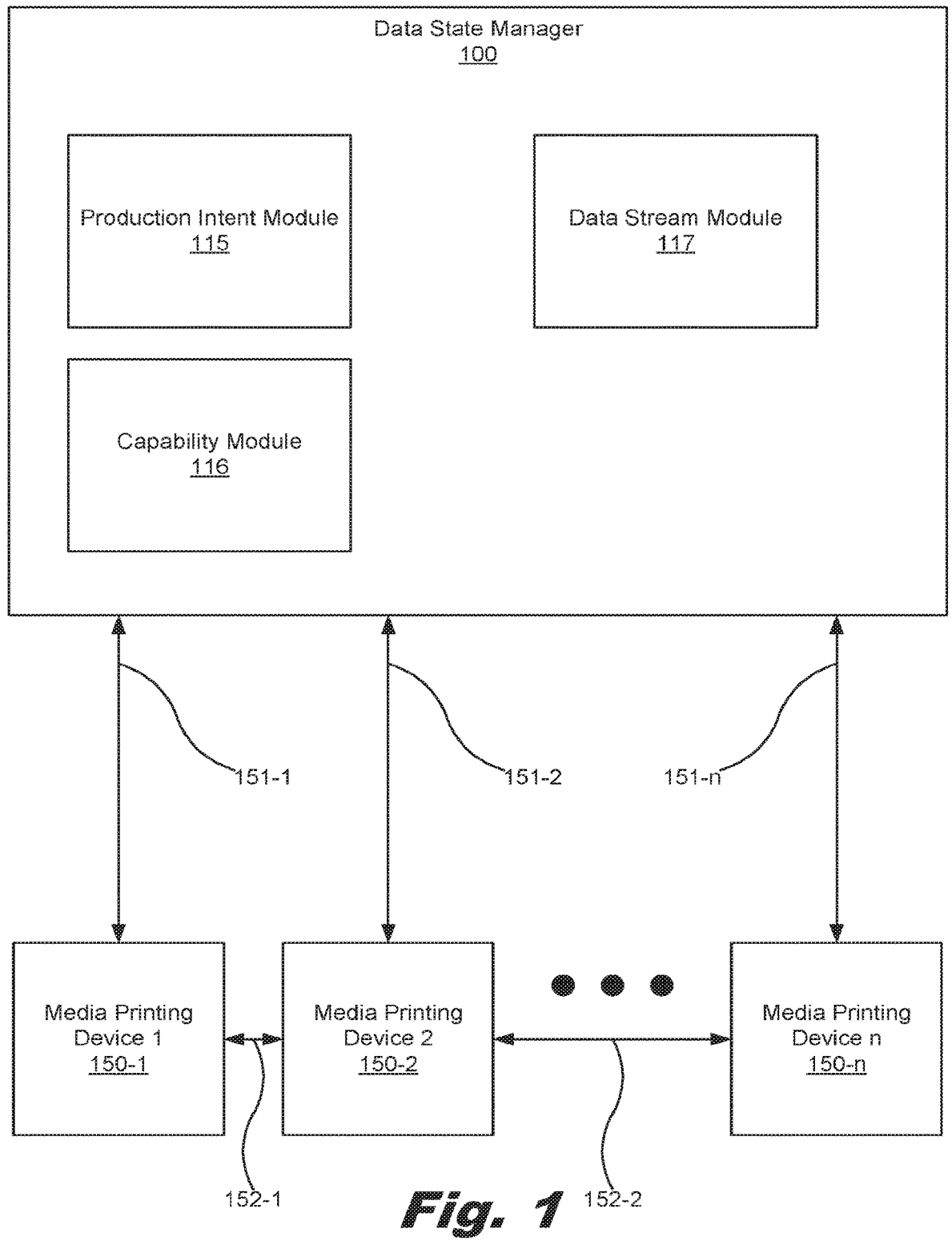
FIG. 1 is a block diagram of a data state manager, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Data processing and synchronization systems such as a digital front end (DFE) device and associated controllers and protocols used by a print service provider (PSP) and that use digital presses may be limited in their capability to support distributed production environments. Even when supporting the representation of complex data structures, these digital press environments do not address the desires of producers to slice, re-constitute, target, synchronize, and reproduce specific production intents in a manner that is scalable, dynamic, and consistent over time.

Examples described herein provide a system that gives producers of the printed products the capability to efficiently slice up print data streams in a most effective manner given the variety of potential evaluation characteristics, efficiently distribute the data stream across multiple production devices such as multiple printing presses, and provides the ability to synchronize the data structures as they process on those distributed devices. This provides for state management of the overall data stream among the multiple printing presses. Further, the examples described herein provide the ability to audit and reproduce those production results such as the printed product as part of a systemic implementation. The production devices such as the digital printing presses described herein may be described as a digital printing press or a composite of a DFE and digital printing press.

The methods described herein provide for the management and synchronization of a data stream in a distributed production environment where a data structure representing a specific production intent may be processed to a plurality of production devices based on metadata embedded within the data structure, characteristics of the final physical product itself represented by the data structure or elements within the data structure, articulated patterns represented as discrete data segments or data branches within the data structure, the target capability of devices in the production environment, the time and/or duration used to fulfill the target production intent, the segment or branch within the data stream given the selection or configuration of any constituent of the above elements, or combinations thereof.

Examples described herein provide a data state manager. The data state manager may include a production intent module to define a production intent, a capability module to identify a number of capabilities of a plurality of media printing devices to which the data state manager is coupled, and a data stream module to, through a plurality of communication links to the media printing devices, stream a plurality of data streams to the plurality of media printing devices in a synchronized manner based on a number of characteristics of the streamed data and the identified capabilities of the media printing devices, the data streams defining the production intent.

The data state manager may also include a data segmenting module to divide the production intent into the plurality of data streams with each data stream being streamed to one of the plurality of media printing devices, and divide at least one of the plurality of data streams into a plurality of discrete data segments. Further, the data state manager may include an error detection module to detect error conditions in the media printing devices, and adapt the data streams to allow recovery of the media printing devices in response to a determination that at least one of the plurality of media printing devices has an error.

The data state manager may also include an auditing module to log the production intent defined by the production intent module in a memory device. Further, the data state manager may include a reconstitution module to implement the logged production intent on the plurality of media printing devices.

Examples described herein may also provide a method of data management in a distributed production environment using a data state manager. The method may include defining a production intent, the production intent comprising data defining a final printed product to be produced by a plurality of media printing devices, dividing the production intent into the plurality of data streams with each data stream being streamed to one of the plurality of media printing devices, and streaming the plurality of data streams to the plurality of media printing devices in a synchronous manner based on a number of characteristics of the streamed data and the identified capabilities of the media printing devices. The method may also include detecting error conditions in the media printing devices, and adapting the data streams to re-synchronize the media printing devices in response to a determination that at least one of the plurality of media printing devices has an error.

Streaming the plurality of data streams to the plurality of media printing devices in a synchronous manner includes synchronizing the data streams based on data stream characteristics, device characteristics, or combinations thereof. The method may also include identifying a number of capabilities of the plurality of media printing devices. Further, the method may include dividing at least one of the plurality of data streams into a plurality of discrete data segments. The method of claim 6, comprising logging the production intent defined by the production intent module in a memory device.

The method may also include determining if a logged production intent has been requested to be printed. In response to a determination that the logged production intent has been requested, reconstituting the logged production intent on the plurality of media printing devices.

Examples described herein may also provide a computer program product for data management in a distributed production environment. The computer program product may include a computer readable storage medium comprising computer usable program code embodied therewith. The computer usable program code to, when executed by a processor, define a production intent, the production intent comprising data defining a final printed product that is produced by a plurality of media printing devices, stream a plurality of data streams to a plurality of media printing devices in a synchronous manner based on a number of characteristics of the data streams and the identified capabilities of the media printing devices, detect error conditions in the media printing devices, and adapt the data streams to re-synchronize the media printing devices in response to a determination that at least one of the plurality of media printing devices has an error.

The computer program product may include computer usable program code to, when executed by the processor, divide the production intent into the plurality of data streams with each data stream being streamed to one of the plurality of media printing devices, and divide at least one of the plurality of data streams into a plurality of discrete data segments. The computer program product may include computer usable program code to, when executed by the processor, identify the number of capabilities of the plurality of media printing devices, identify a number of characteristics of the data streams, and synchronize the data streams based on the characteristics of the data streams, the capabilities of the plurality of media printing devices, or combinations thereof.

The computer program product of claim 12, comprising computer usable program code to, when executed by the processor, log the production intent defined by the production intent module in a memory device, determine if a logged production intent has been requested to be printed, and in response to a determination that the logged production intent has been requested, reconstitute the logged production intent on the plurality of media printing devices.

As used in the present specification and in the appended claims, the term "distributed production environment" is meant to be understood broadly as a plurality of printing devices that are controlled by a data state manager.

As used in the present specification and in the appended claims, the term "production device" is meant to be understood broadly as any device used to produce a printed product. For example, the production devices may include printing presses, digital printing presses, printing devices, collating devices, finishing devices, thermal inkjet printing devices, other printing devices, or combinations thereof.

As used in the present specification and in the appended claims, the term "production intent" is meant to be understood broadly as any print job that includes divisible portions that may be sent to a plurality of production devices such as a plurality of printing presses.

Turning now to the figures, FIG. 1 is a block diagram of a data state manager (100), according to an example of the principles described herein. The data state manager (100) may include a production intent module (115) to define a production intent. As described herein, the production intent is any print job that includes divisible portions that may be sent to a plurality of production devices such as the media printing devices (150-1, 150-2, 150-*n*, collectively referred to herein as 150) communicatively coupled to the data state manager (100).

As depicted in FIG. 1, n number of media printing devices (150) are communicatively coupled to the data state manager (100) with n and the associated ellipsis depicted in FIG. 1 as designating at least a plurality of media printing devices (150) and up to an infinite number of media printing devices (150). The media printing devices (150) may be wired or wirelessly communicatively coupled to the data state manager (100). The communication links (151-1, 151-2, 151-*n*, collectively referred to herein as 151) designate not only a transfer of data over the communicative couplings (151), but also the streaming of data to each of the media printing devices (150) as a number of separate branches or portions of a whole data stream from the data state manager (100). The whole of the data stream is divided in to the separate branches of data that are transmitted over the communication links (151). Thus, the data state manager (100) streams a plurality of branches of the data stream to the individual media printing devices (150). In one example, at least one of the branches of the data stream may be further divided into a plurality of segments. In this example, the segments are transferred to the target media printing device (150) by dividing the branch of the streaming data into the number of segments, and transmitting the segments individually. Data segmentation is a method of division of a data stream that is intended to improve file transfer speeds by simultaneously transmitting portions of the data stream sourced from the data state manager (100), and recombining the portions into the single set of data. A data segment is broadly defined as any division of a data stream.

The data state manager (100) may also include a capability module (116) to identify a number of capabilities of each of the plurality of media printing devices (150) to which the data state manager (100) is coupled. The media printing devices (150) may include a number of different printing capabilities such as, for example, printing in grayscale, monotone and/or colors, types of colors and color schemes available, printing speeds, printing in simplex and/or duplex, media finishing capabilities, among other printing device or printing press capabilities. The portions of the production intent that call for a specific printing capability or capabilities may be sent to a media printing device (150) that is capable of fulfilling those requested print requests.

The data state manager (100) may also include a data stream module (117) to, through the plurality of communication links (151) to the media printing devices (150), stream a plurality of data streams to the plurality of media printing devices (150) in a synchronized manner based on a number of characteristics of the streamed data and the identified capabilities of the media printing devices (150).

The data streams define the production intent and include divided portions of a whole data set that define the production intent.

The communication links (151) are bidirectional such that data may be transmitted from the media printing devices (150) to the data state manager (100). Examples of data that may be transmitted from the media printing devices (150) to the data state manager (100) include data regarding the capabilities of each of the media printing devices (150) as requested by the capability module (116), data regarding the state of the media printing devices (150), data regarding the speed at which the media printing devices (150) are working, data regarding the progress of a print job, other properties, states, or characteristics of the media printing devices (150), errors that occur within the media printing devices (150), and combinations thereof.

In one example, the media printing devices (150) may be communicatively coupled to one another via a number of inter-device communication links (152-1, 152-2, collectively referred to herein as 152). These inter-device communication links (152) serve to allow for the media printing devices (150) to coordinate with one another to synchronize their individual productions as instructed by the data state manager (100). For example, the media state manager (100) may detect an error in the first one of the media printing devices (150-1) and instruct the remaining media printing devices (150-2, 150-n) to slow down to allow a user to correct the issue with the first media printing device (150-1) and catch up with its production in order to maintain the synchronous production among the media printing devices (150).

Figure 2:
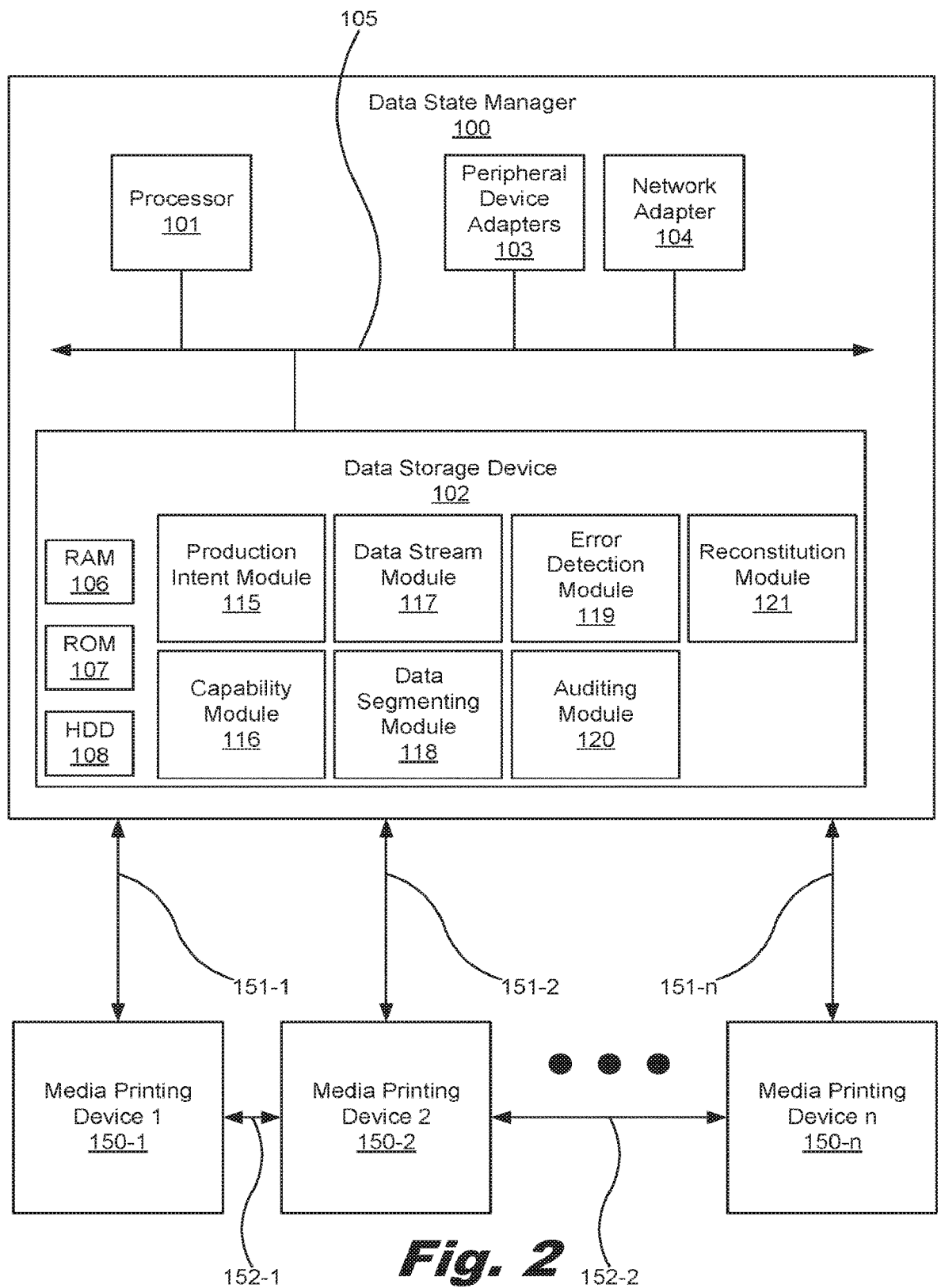
FIG. 2 is a block diagram of a data state manager, according to an example of the principles described herein.

FIG. 2 is a block diagram of a data state manager (200), according to an example of the principles described herein. The example of FIG. 2 includes elements similar to those found in the example of FIG. 1 and the description of these elements may be found in connection with the description of FIG. 1 and elsewhere. The data state manager (200) may be implemented in an electronic device. Examples of electronic devices include servers, desktop computers, laptop computers, personal digital assistants (PDAs), mobile devices, smartphones, gaming systems, and tablets, among other electronic devices.

The data state manager (200) may be utilized in any data processing scenario including, stand-alone hardware, mobile applications, through a computing network, or combinations thereof. Further, the data state manager (200) may be used in a computing network, a public cloud network, a private cloud network, a hybrid cloud network, other forms of networks, or combinations thereof. In one example, the methods provided by the data state manager (200) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the data state manager (200) are executed by a local administrator.

To achieve its desired functionality, the data state manager (200) comprises various hardware components. Among these hardware components may be a number of processors (101), a number of data storage devices (102), a number of peripheral device adapters (103), and a number of network adapters (104). These hardware components may be interconnected through the use of a number of busses and/or network connections. In one example, the processor (101), the data storage device (102), the peripheral device adapter (103), and the network adapter (104) may be communicatively coupled via a bus (105).

The processor (101) may include the hardware architecture to retrieve executable code from the data storage device (102) and execute the executable code. The executable code may, when executed by the processor (101), cause the processor (101) to implement at least the functionality of the methods of the present specification described herein. In the course of executing code, the processor (101) may receive input from and provide output to a number of the remaining hardware units.

The data storage device (102) may store data such as executable program code that is executed by the processor (101) or other processing device. As will be discussed, the data storage device (102) may specifically store computer code representing a number of applications that the processor (101) executes to implement at least the functionality described herein. The data storage device (102) may include various types of memory modules, including volatile and nonvolatile memory. For example, the data storage device (102) of the present example includes Random Access Memory (RAM) (106), Read Only Memory (ROM) (107), and Hard Disk Drive (HDD) memory (108). Many other types of memory may also be utilized, and the present specification contemplates the use of many varying type(s) of memory in the data storage device (102) as may suit a particular application of the principles described herein. In certain examples, different types of memory in the data storage device (102) may be used for different data storage needs. For example, in certain examples the processor (101) may boot from Read Only Memory (ROM) (107), maintain nonvolatile storage in the Hard Disk Drive (HDD) memory (108), and execute program code stored in Random Access Memory (RAM) (106).

The data storage device (102) may comprise a computer readable medium, a computer readable storage medium, or a non-transitory computer readable medium, among others. For example, the data storage device (102) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters (103, 104) in the data state manager (200) enable the processor (101) to interface with various other hardware elements, external and internal to the data state manager (200) including, for example, the media printing devices (150). Further, the peripheral device adapters (103) may provide an interface to input/output devices, such as, for example, a display device, a mouse, or a keyboard. The peripheral device adapters (103) may also provide access to other external devices such as an external storage device, a number of network devices such as, for example, servers, switches, and routers, client devices, other types of computing devices, and combinations thereof. The network adapter (104) may provide an interface to other computing devices within, for example, a network, thereby enabling the transmission of data between the data state manager (200) and other devices located within the network.

The data state manager (200) further comprises a number of modules used in the implementation of the methods described herein. The various modules within the data state manager (200) comprise executable program code that may be executed separately. In this example, the various modules may be stored as separate computer program products. In another example, the various modules within the data state manager (200) may be combined within a number of computer program products; each computer program product comprising a number of the modules.

The data state manager (200) may include the production intent module (115), the capability module (116), and the data stream module (117), a data segmenting module (118), an error detection module (119), an auditing module (120), and a reconstitution module (121) described in connection with FIG. 1 and elsewhere herein. The processor (101) executes these modules as instructed and based on the methods described herein in connection with FIGS. 3 through 5 and the functions of the production intent module (115), the capability module (116), and the data stream module (117) described herein. Specifically, the modules (115, 116, 117, 118, 119, 120, 121) serve to manage and synchronize the data stream in a distributed production environment where a data structure representing a specific production intent may be processed to at least two media printing devices (150).

The production intent module (115) may, when executed by the processor (101), defining a production intent including data defining a final printed product to be produced by the plurality of the media printing devices (150). The capability module (116) may, when executed by the processor (101), identify a number of capabilities of each of the plurality of media printing devices (150) to which the data state manager (100) is coupled. Further, the data stream module (117) may, when executed by the processor (101), stream the plurality of data streams to the plurality of media printing devices in a synchronous manner based on a number of characteristics of the streamed data and the identified capabilities of the media printing devices (150). The data segmenting module (118) may, when executed by the processor (101), divide the production intent into the plurality of data streams with each data stream being streamed to one of the plurality of media printing devices (150). Specifically, the data segmenting module (118) may divide the production intent into a plurality of data streams with each data stream being streamed to one of the plurality of media printing devices, and divide at least one of the plurality of data streams into a plurality of discrete data segments.

The error detection module (119) may, when executed by the processor (101), detect error conditions in the media printing devices (150) and request updates regarding error states of the media printing devices (150) at any interval or any number of times during the operations of the media printing devices (150). The error detection module (119) may also, when executed by the processor (101), adapt the data streams to allow recovery of the media printing devices (150) in response to a determination that at least one of the plurality of media printing devices has an error.

The auditing module (120) may, when executed by the processor (101), audit and log the production intent defined by the production intent module (115) in the memory device (102) for later additional or derivative executions of the production intent. Further, the reconstitution module (121) may, when executed by the processor (101), reconstitute logged production intents on the plurality of media printing devices (150).

Figure 3:
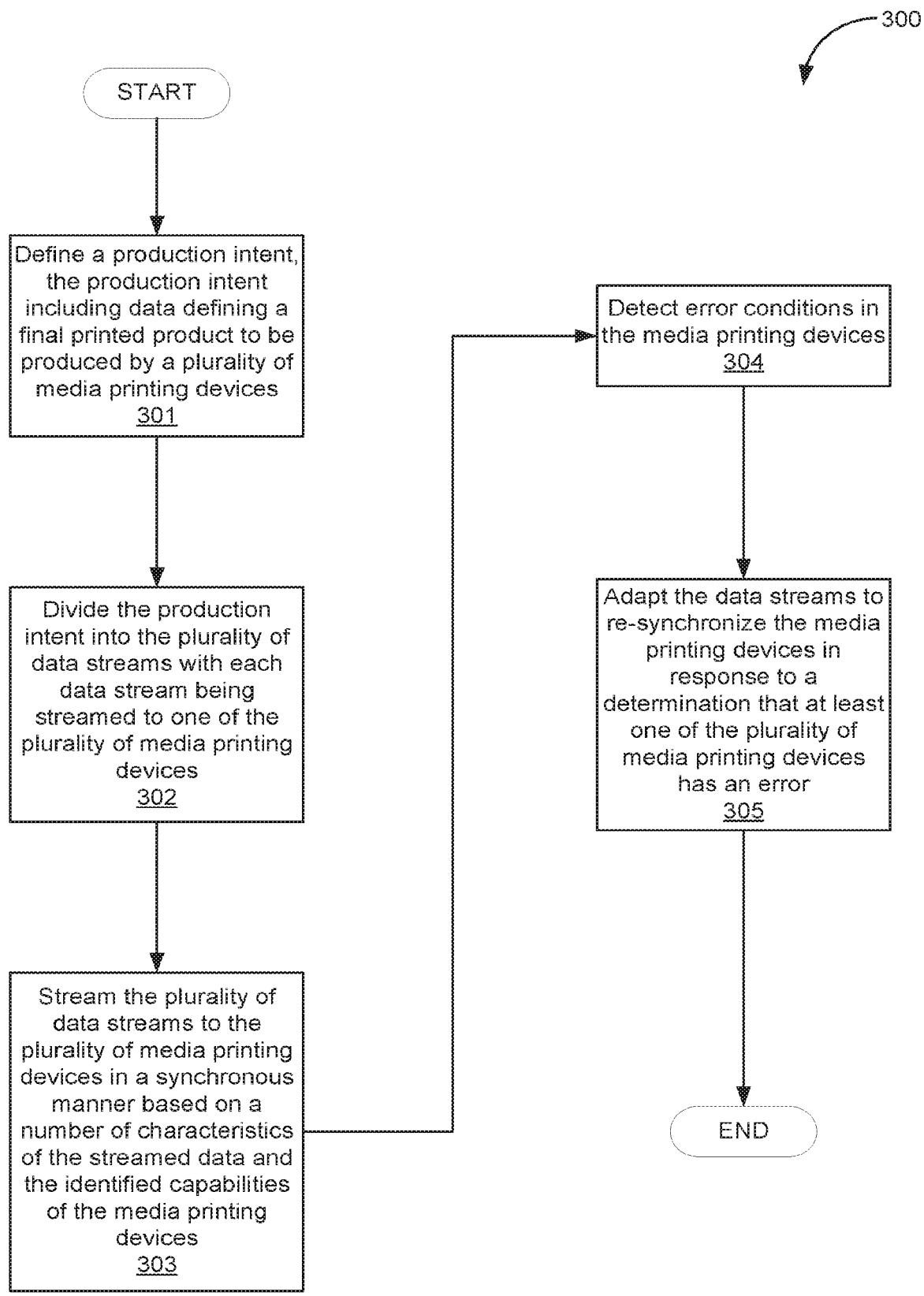
FIG. 3 is a flowchart showing a method of data management in a distributed production environment using a data state manager, according to an example of the principles described herein.

FIG. 3 is a flowchart showing a method (300) of data management in a distributed production environment using the data state manager (100, 200, collectively referred to herein as 100), according to an example of the principles described herein. The method (300) may include defining (block 301) a production intent. As described herein, the production intent may include data defining a final printed product to be produced by a plurality of the media printing devices (150). The production intent may be obtained from a separate source including, for example, a client who is requesting a print service provider (PSP) to complete the production intent. In another example, the production intent may be developed and/or provided by the PSP.

The method (300) may also include dividing (block 302) the production intent into the plurality of data streams with each data stream being streamed to one of the plurality of media printing devices (150). In one example, the data segmenting module (118) may be executed by the processor (101) of the data state manager (100) to divide (block 302) the production intent into the plurality of data streams. Division (block 302) of the production intent may be based on the logical divisions of the production intent, meta data embedded within the data structure of the production intent, characteristics of the final to-be-printed physical product itself represented by the data structure or elements within the data structure, articulated patterns represented as discrete data segments or data branches within the data structure, the capabilities of the media printing devices (150) within the production environment, the time and/or duration used to fulfill the target production intent, and combinations thereof. The capabilities of the media printing devices (150) may be detected and determined by execution of the capability module (116).

The method may also include streaming (block 303) the plurality of data streams to the plurality of media printing devices in a synchronous manner based on a number of characteristics of the streamed data and the identified capabilities of the media printing devices (150). The data streams are transmitted to the media print devices (150) via the communication links (151).

Error conditions may be detected (block 304) in the media printing devices (150) by executing the data stream module (117) and error detection module (119) that requests updates at any interval. As may occur, any one or multiple ones of the media printing devices (150) may experience an error in printing. These errors may include the depletion of printing resources such as print media or printing fluids (e.g., ink), a fault in the mechanical systems within the media printing devices (150), a communication error between the data state manager (100) and any number of the media printing devices (150), or other types of errors that may exist within a distributed production environment. In response to a determination that at least one of the plurality of media printing devices (150) has an error, the method may include adapting (block 305) the data streams to re-synchronize the media printing devices (150). Re-synchronization of the media printing devices (150) may include speeding up the media printing device(s) (150) that experienced the error, slowing down the media printing device(s) (150) that did not experience an error, and combinations thereof. The data state manager (100), executing the data stream module (117), may re-synchronize the media printing devices (150).

Figure 4:
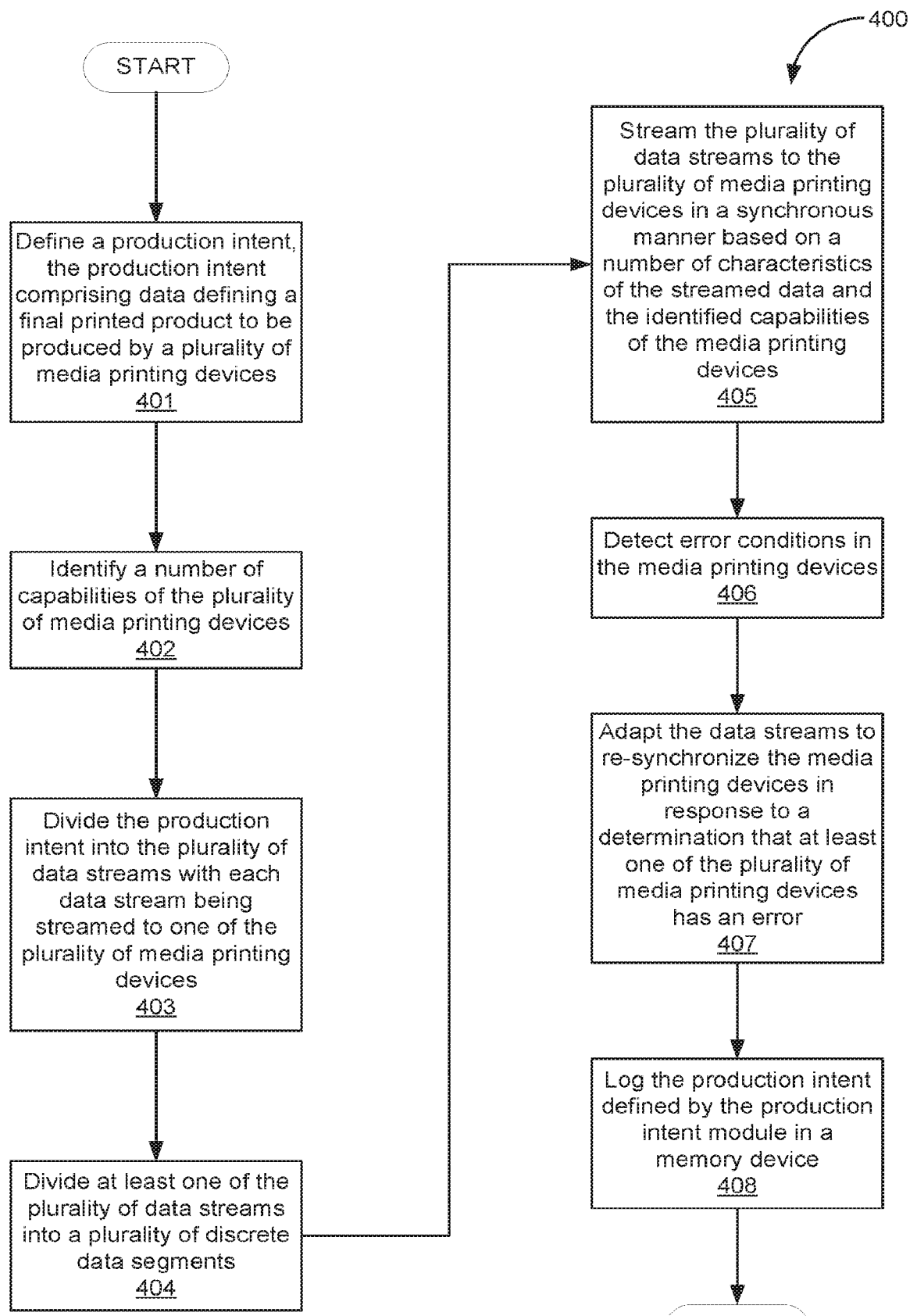
FIG. 4 is a flowchart showing a method of data management in a distributed production environment using a data state manager, according to an example of the principles described herein.

FIG. 4 is a flowchart showing a method (400) of data management in a distributed production environment using the data state manager (100), according to an example of the principles described herein. Block 401 of FIG. 4 is similar to block 301 of FIG. 3, and the method (400) may include identifying (block 402) a number of the capabilities of the plurality of media printing devices (150). This may be performed by executing the capability module (116).

Block 403 of FIG. 4 is similar to block 302 of FIG. 3, and the method (400) may include dividing (block 404) at least one of the plurality of data streams into a plurality of discrete data segments. Dividing (block 404) the data streams into the data segments provides for an improvement in file transfer speeds by simultaneously transmitting portions of the data stream sourced from the data state manager (100), and recombining the portions into the single set of data.

Blocks 405 through 407 of FIG. 4 are similar to blocks 303 through 305 of FIG. 3. The data stream module (117) and auditing module (120) may be executed by the processor (101) of the data state manager (100) to log (block 408) the production intent defined by the production intent module (115) in the memory device (102). In this manner, the production intent may be stored for a later execution of the production intent. In one example, the production intent may be modified or supplemented, and stored in that modified and/or supplemented state for later execution.

Figure 5:
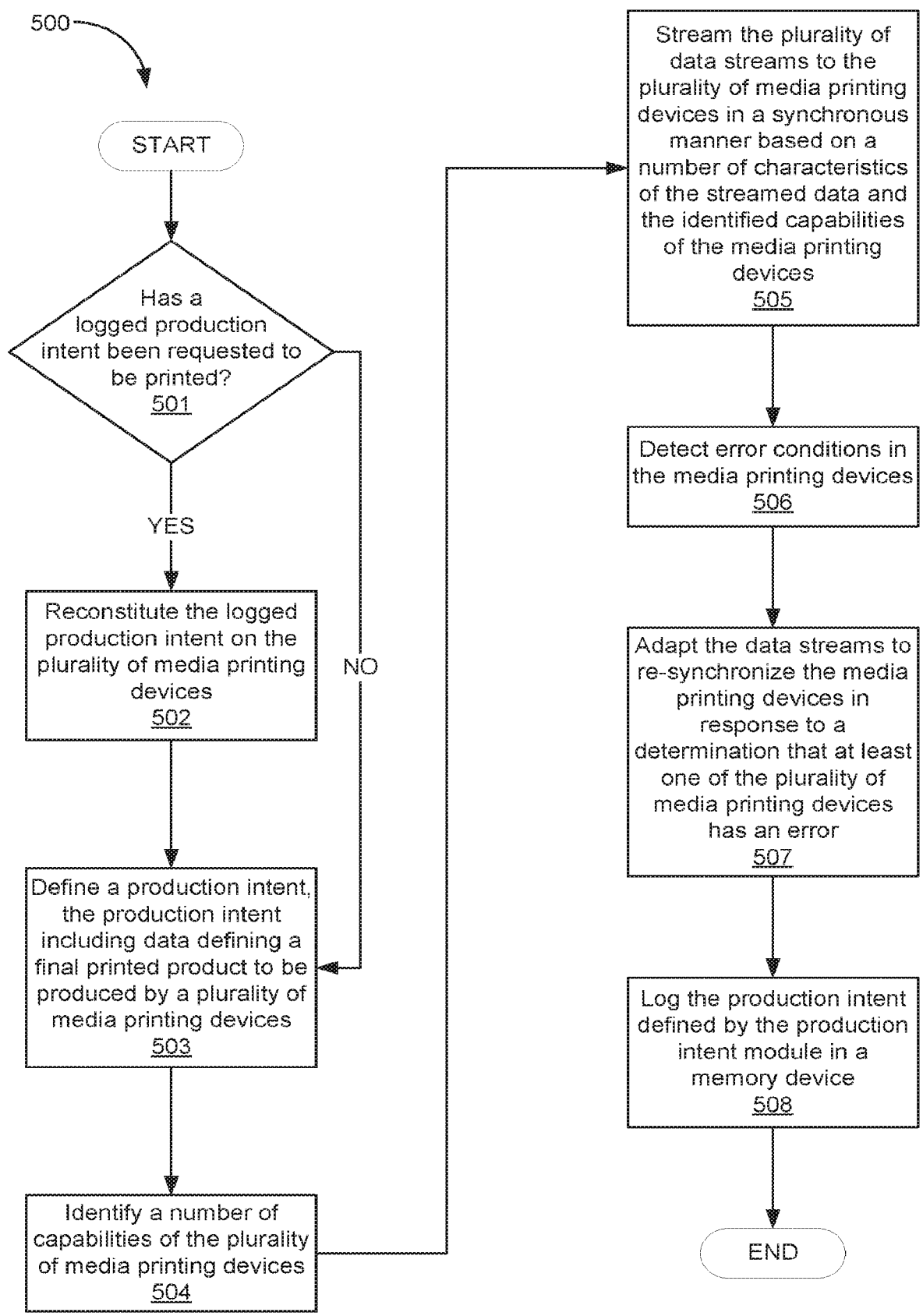
FIG. 5 is a flowchart showing a method of data management in a distributed production environment using a data state manager, according to an example of the principles described herein.

FIG. 5 is a flowchart showing a method (500) of data management in a distributed production environment using a data state manager, according to an example of the principles described herein. The method (500) of FIG. 5 may include determining (block 501) whether a logged production intent has been requested to be printed. In response to a determination that a logged production intent is to be printed (block 501, determination YES), the processor (101), executing the production intent module (115) and the reconstitution module (121), may reconstitute (block 502) the logged production intent on the plurality of media printing devices (150). However, in response to a determination that a logged production intent is not to be printed (block 501, determination NO), the processor (101), executing the production intent module (115), may define (block 503) a production intent in a similar manner as described herein in connection with block 401 of FIG. 4. Blocks 504 through 508 of FIG. 5 proceed as similar to blocks 402 and 405 through 408, respectively, and their description is provided herein in connection with FIG. 4 and elsewhere. Thus, the method (500) may include identifying (block 504) a number of the capabilities of the plurality of media printing devices (150), and streaming (block 505) the plurality of data streams to the plurality of media printing devices in a synchronous manner. Error conditions may be detected (block 506) in the media printing devices (150) by executing the data stream module (117), and the data streams may be adapted (block 507) to re-synchronize the media printing devices (150). The data stream module (117) may be executed by the processor (101) of the data state manager (100) to log (block 508) the production intent defined by the production intent module (115) in the memory device (102).

Figure 6:
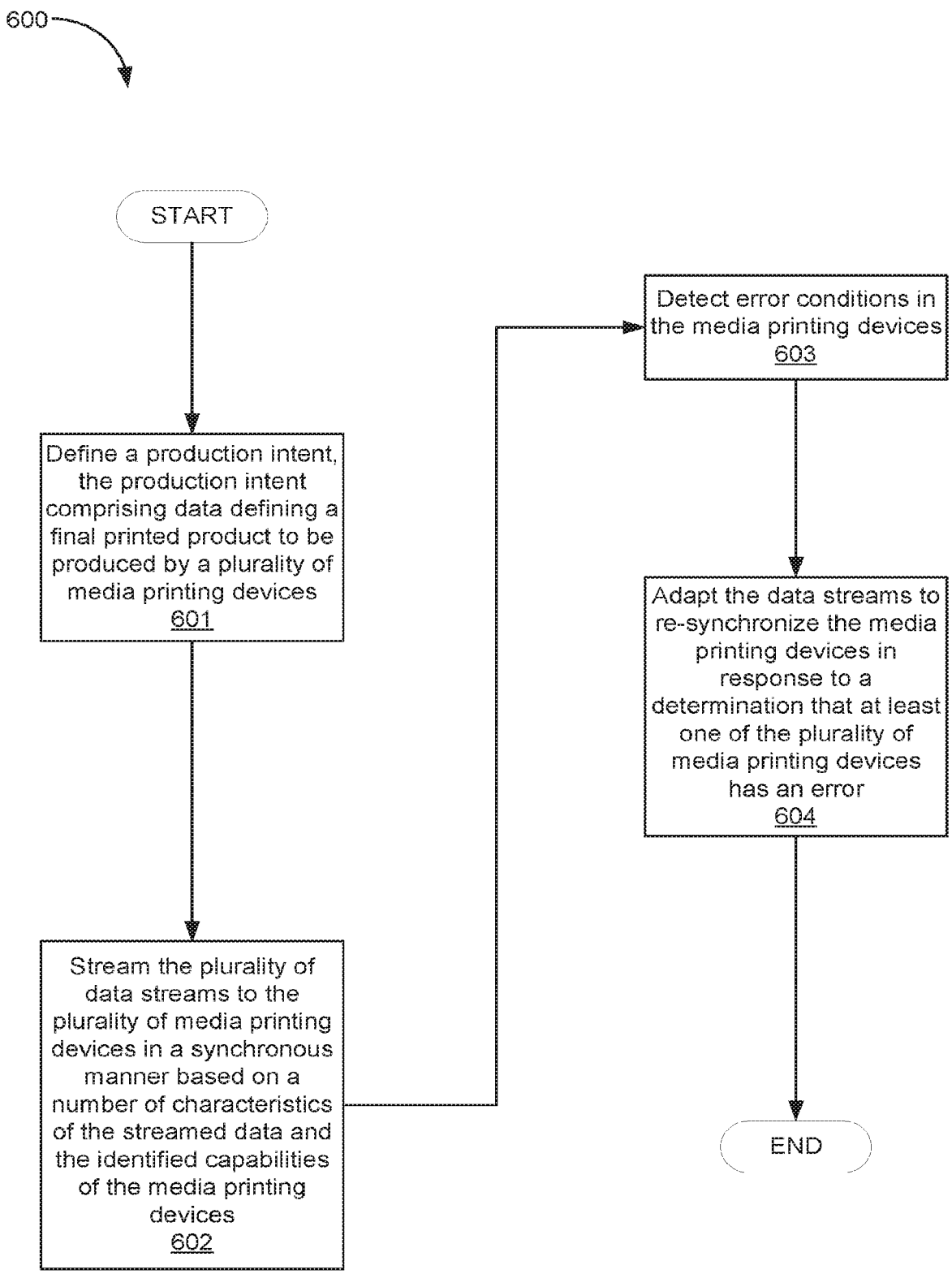
FIG. 6 is a flowchart showing a method of data management in a distributed production environment using a data state manager, according to an example of the principles described herein.

FIG. 6 is a flowchart showing a method (600) of data management in a distributed production environment using a data state manager (100), according to an example of the principles described herein. The method of FIG. 6, and any method described herein may be implemented as a computer program product. Thus, each block of the flowchart illustrations and block diagrams, and combinations of blocks in the flowchart illustrations and block diagrams, may be implemented by computer usable program code. The computer usable program code may be provided to the processor (FIG. 2, 101) of the data state manager (100) to produce a machine, such that the computer usable program code, when executed via the processor (101), implements the functions or acts specified in the flowchart and/or block diagram block or blocks of FIGS. 3 through 6. In one example, the computer usable program code may be embodied within a computer readable storage medium; the computer readable storage medium being part of the computer program product. In one example, the computer readable storage medium is a non-transitory computer readable medium as described herein in connection with FIG. 2.

The method (600) may include defining (block 601) a production intent. As described herein, the production intent may include data defining a final printed product to be produced by a plurality of the media printing devices (150). The production intent may be obtained from a separate source including, for example, a client who is requesting a print service provider (PSP) to complete the production intent. In another example, the production intent may be developed and/or provided by the PSP. The method (600) streaming (block 602) the plurality of data streams to the plurality of media printing devices in a synchronous manner based on a number of characteristics of the streamed data and the identified capabilities of the media printing devices (150). The data streams may be adapted (block 507) to re-synchronize the media printing devices (150). At block 603, error conditions may be detected in the media printing devices (150) by executing the data stream module (117), and the data streams may be adapted (block 604) to re-synchronize the media printing devices (150) as similarly described above in connection with blocks 506 and 507 of FIG. 5.

The specification and figures describe a data state manager. The data state manager may include a production intent module to define a production intent, a capability module to identify a number of capabilities of a plurality of media printing devices to which the data state manager is coupled, and a data stream module to, through a plurality of communication links to the media printing devices, stream a plurality of data streams to the plurality of media printing devices in a synchronized manner based on a number of characteristics of the streamed data and the identified capabilities of the media printing devices, the data streams defining the production intent. This data state manager and its associated methods provide a single device that processes a data stream for consumption by a plurality of media printing devices, divide, process, log and reconstitute production intents across at least two synchronized media printing devices.

The preceding description has been presented to illustrate and describe examples of the principles described. This description is not intended to be exhaustive or to limit these principles to any precise form disclosed. Many modifications and variations are possible in light of the above teaching.

What is claimed is:

1. A data state manager, comprising:
a production intent module to define a production intent;
a capability module to identify a number of capabilities of a plurality of media printing devices to which the data state manager is coupled; and
a data stream module to, through a plurality of communication links to the media printing devices, stream a plurality of data streams to the plurality of media printing devices in a synchronized manner based on a number of characteristics of the streamed data and the identified capabilities of the media printing devices, the data streams defining the production intent.

2. The data state manager of claim 1, comprising a data segmenting module to:
divide the production intent into the plurality of data streams with each data stream being streamed to one of the plurality of media printing devices; and
divide at least one of the plurality of data streams into a plurality of discrete data segments.

3. The data state manager of claim 1, comprising an error detection module to:
detect error conditions in the media printing devices; and
adapt the data streams to allow recovery of the media printing devices in response to a determination that at least one of the plurality of media printing devices has an error.

4. The data state manager of claim 1, comprising an auditing module to log the production intent defined by the production intent module in a memory device.

5. The data state manager of claim 4, comprising a reconstitution module to implement the logged production intent on the plurality of media printing devices.

6. The data state manager of claim 1, further comprising a number of inter-device communication links disposed between the plurality of media printing capacities.

7. A method of data management in a distributed production environment using a data state manager, comprising:
dividing a print job into a plurality of data streams with each data stream being streamed to one of a plurality of media printing devices;
streaming the plurality of data streams to the plurality of media printing devices in a synchronous manner based on a number of characteristics of the streamed data and identified capabilities of the media printing devices;
detecting error conditions in any of the media printing devices; and
adjusting the data streams in response to a determination that at least one of the plurality of media printing devices has an error.

8. The method of claim 7, wherein streaming the plurality of data streams to the plurality of media printing devices in a synchronous manner comprises synchronizing the data streams based on data stream characteristics or device characteristics.

9. The method of claim 7, comprising, in advance of accepting the print job, identifying a number of capabilities of the plurality of media printing devices to which the data state manager is connected.

10. The method of claim 7, comprising dividing at least one of the plurality of data streams into a plurality of discrete data segments.

11. The method of claim 7, comprising logging the production intent defined by the production intent module in a memory device.

12. The method of claim 11, comprising:
determining if a logged production intent has been requested to be printed; and
in response to a determination that the logged production intent has been requested, reconstituting the logged production intent on the plurality of media printing devices.

13. The method of claim 7, wherein adapting the data streams to re-synchronize the media printing devices comprises speeding up a media printing device which experienced an error.

14. The method of claim 7, wherein adapting the data streams to re-synchronize the media printing devices comprises slowing down a media printing device which did not experience an error.

15. The method of claim 7, wherein dividing the print job into the plurality of data streams is based on a duration to print the print job.

16. A computer program product for data management in a distributed production environment, the computer program product comprising:
a non-transitory computer readable storage medium comprising computer usable program code embodied therewith, the computer usable program code to, when executed by a processor, cause the processor to:
receive data for a production intent, the production intent comprising data defining a final printed product that is produced by a plurality of media printing devices;
divide the production intent into a plurality of data streams wherein
a data stream comprises a divided portion of a data set that defines the production intent, and
each data stream is to be streamed to one of the plurality of media printing devices;
stream the plurality of data streams to a plurality of media printing devices in a synchronous manner based on a number of characteristics of the data streams and previously identified capabilities of the media printing devices, wherein portions of the production intent which call for a specific printing capability are streamed to a media printing device with an associated capability;
detect error conditions in the media printing devices; and
adjust the data streams in response to a determination that at least one of the plurality of media printing devices has an error.

17. The computer program product of claim 16, comprising computer usable program code to, when executed by the processor:
divide at least one of the plurality of data streams into a plurality of discrete data segments.

18. The computer program product of claim 16, comprising computer usable program code to, when executed by the processor:
identify a number of characteristics of the data streams; and
synchronize the data streams based on the characteristics of the data streams or the capabilities of the plurality of media printing devices.

19. The computer program product of claim 16, comprising computer usable program code to, when executed by the processor:
log the production intent defined by the production intent module in a memory device;

determine if a logged production intent has been requested to be printed; and in response to a determination that the logged production intent has been requested, reconstitute the logged production intent on the plurality of media printing devices.

20. The computer program product of claim 16, wherein adapting the data streams to re-synchronize the media printing devices comprises instructing media printing devices which have not experienced an error to slow down to allow for action on a media printing device which experienced an error.

\* \* \* \* \*